United States Patent
Sen et al.

(10) Patent No.: US 10,838,951 B2
(45) Date of Patent: Nov. 17, 2020

(54) QUERY INTERPRETATION DISAMBIGUATION

(71) Applicant: International Business Machines Corporation, Armonk, NY (US)

(72) Inventors: Jaydeep Sen, Kolkata (IN); Karthik Sankaranarayanan, Bangalore (IN); Diptikalyan Saha, Bangalore (IN); Manasa Markandeya Jammi, Kharagpur (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 270 days.

(21) Appl. No.: 15/943,448

(22) Filed: Apr. 2, 2018

(65) Prior Publication Data
US 2019/0303473 A1      Oct. 3, 2019

(51) Int. Cl.
*G06F 16/00*      (2019.01)
*G06F 16/242*     (2019.01)

(52) U.S. Cl.
CPC ........ *G06F 16/2425* (2019.01); *G06F 16/243* (2019.01); *G06F 16/2428* (2019.01)

(58) Field of Classification Search
CPC . G06F 16/3329; G06F 16/243; G06F 16/3344
See application file for complete search history.

(56) References Cited

U.S. PATENT DOCUMENTS

| | | |
|---|---|---|
| 8,601,015 B1 | 12/2013 | Wolfram et al. |
| 2005/0080780 A1 | 4/2005 | Colledge et al. |
| 2006/0206463 A1 | 9/2006 | Takachio et al. |
| 2015/0039536 A1 | 2/2015 | Cook et al. |
| 2017/0075953 A1* | 3/2017 | Bozkaya ........... G06F 16/24522 |

(Continued)

OTHER PUBLICATIONS

Saha, Diptikalyan et al., "ATHENA: An Ontology-Driven System for Natural Language Querying over Relational Data Stores", Proceedings of the VLDB Endowment, 2016, 12 pages, vol. 9, No. 12, VLDB Endowment.

(Continued)

*Primary Examiner* — Hung Q Pham
(74) *Attorney, Agent, or Firm* — Ference & Associates, LLC (57) ABSTRACT

One embodiment provides a method, including: receiving a natural language query from a user; identifying a plurality of interpretations for interpreting the natural language query, wherein the plurality of interpretations are based upon at least one ambiguity in the received natural language query; generating, for each of the plurality of interpretations, a plurality of example queries; generating, for each of the interpretations, both (i) an answer to the received natural language query and (ii) an answer to each of the generated plurality of example queries; and providing, to the user, (i) the generated answer for each interpretation of the natural language query and (ii) a plurality of question/answer pairs for each of the identified plurality of interpretations that assists in disambiguating the ambiguity, wherein each question/answer pair comprises at least one of the generated plurality of example queries and the corresponding generated answer to the example query.

20 Claims, 8 Drawing Sheets

(56) References Cited

U.S. PATENT DOCUMENTS

2018/0121500 A1* 5/2018 Reschke ................ G06F 40/30

OTHER PUBLICATIONS

Mayer, Mikal et al., "User Interaction Models for Disambiguation in Programming by Example", UIST '15, Nov. 8-11, 2015, Charlotte, NC, USA, 13 pages, ACM Digital Library.
Gollapudi, Sreenivas et al., "An Axiomatic Approach for Result Diversification", WWW 2009, Apr. 20-24, 2009, Madrid, Spain, 10 pages, ACM Digital Library.
Demidova, Elena et al., "DivQ: Diversification for Keyword Search over Structured Databases", SIGIR '10, Jul. 19-23, 2010, Geneva, Switzerland, 8 pages, ACM Digital Library.
Bouchoucha, Arbi et al., "Diversified Query Expansion using ConceptNet", CIKM '13, Oct. 27-Nov. 1, 2013, San Francisco, CA, USA, 4 pages, ACM Digital Library.

* cited by examiner

QUERY INTERPRETATION DISAMBIGUATION

BACKGROUND

When a person or user has a question or query, the person can access different sources for determining the answer. One source is a system where the user provides the query and the system returns the answer to the query, for example, a digital assistant, virtual assistant, or the like. These systems, and other systems that process user input including queries, generally have a natural language processing system or component that allows processing of a natural language input or query. Since the user generally provides the input as a natural language input (e.g., an input provided using ordinary language as opposed to artificial or computer language), the system generally converts the natural language input to a computer language that the computer can process. Using the converted input the system can access one or more sources (e.g., training data, databases, information sources, etc.) to obtain a response to the input. The system then provides this response back to the user, sometimes in the form of a natural language response.

BRIEF SUMMARY

In summary, one aspect of the invention provides a method, comprising: receiving a natural language query from a user; identifying a plurality of interpretations for interpreting the natural language query, wherein the plurality of interpretations are based upon at least one ambiguity in the received natural language query; generating, for each of the plurality of interpretations, a plurality of example queries, wherein the generated plurality of example queries across the plurality of interpretations comprises queries for distinguishing the corresponding interpretation; generating, for each of the interpretations, both (i) an answer to the received natural language query and (ii) an answer to each of the generated plurality of example queries; and providing, to the user, (i) the generated answer for each interpretation of the natural language query and (ii) a plurality of question/answer pairs for each of the identified plurality of interpretations that assists in disambiguating the ambiguity, wherein each question/answer pair comprises at least one of the generated plurality of example queries and the corresponding generated answer to the example query.

Another aspect of the invention provides an apparatus, comprising: at least one processor; and a computer readable storage medium having computer readable program code embodied therewith and executable by the at least one processor, the computer readable program code comprising: computer readable program code configured to receive a natural language query from a user; computer readable program code configured to identify a plurality of interpretations for interpreting the natural language query, wherein the plurality of interpretations are based upon at least one ambiguity in the received natural language query; computer readable program code configured to generate, for each of the plurality of interpretations, a plurality of example queries, wherein the generated plurality of example queries across the plurality of interpretations comprises queries for distinguishing the corresponding interpretation; computer readable program code configured to generate, for each of the interpretations, both (i) an answer to the received natural language query and (ii) an answer to each of the generated plurality of example queries; and computer readable program code configured to provide, to the user, (i) the generated answer for each interpretation of the natural language query and (ii) a plurality of question/answer pairs for each of the identified plurality of interpretations that assists in disambiguating the ambiguity, wherein each question/answer pair comprises at least one of the generated plurality of example queries and the corresponding generated answer to the example query.

An additional aspect of the invention provides a computer program product, comprising: a computer readable storage medium having computer readable program code embodied therewith, the computer readable program code executable by a processor and comprising: computer readable program code configured to receive a natural language query from a user; computer readable program code configured to identify a plurality of interpretations for interpreting the natural language query, wherein the plurality of interpretations are based upon at least one ambiguity in the received natural language query; computer readable program code configured to generate, for each of the plurality of interpretations, a plurality of example queries, wherein the generated plurality of example queries across the plurality of interpretations comprises queries for distinguishing the corresponding interpretation; computer readable program code configured to generate, for each of the interpretations, both (i) an answer to the received natural language query and (ii) an answer to each of the generated plurality of example queries; and computer readable program code configured to provide, to the user, (i) the generated answer for each interpretation of the natural language query and (ii) a plurality of question/answer pairs for each of the identified plurality of interpretations that assists in disambiguating the ambiguity, wherein each question/answer pair comprises at least one of the generated plurality of example queries and the corresponding generated answer to the example query.

A further aspect of the invention provides a method, comprising: receiving a query; identifying at least one ambiguity in the received query resulting in a plurality of possible interpretations for the received query; producing a plurality of assisting queries for each of the plurality of interpretations, wherein the assisting queries assist in disambiguating the identified at least one ambiguity in the received query across the plurality of possible interpretations; generating (i) a plurality of answers for the received query, each of the plurality of answers corresponding to one of the plurality of possible interpretations and (ii) an answer for each of the plurality of assisting queries; and displaying, for each of the plurality of possible interpretations, (i) the generated plurality of answers and (ii) a plurality of assisting question/answer sets, wherein each assisting question/answer set comprises one of the produced plurality of assisting queries and the corresponding generated answer.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-8. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 8. In accordance with an example embodiment, all of the process steps, components and outputs discussed with respect to FIGS. 1-7 can be performed or utilized by way of a processing unit or units and system memory such as those indicated, respectively, at 16' and 28' in FIG. 8, whether on a server computer, a client computer, a node computer in a distributed network, or any combination thereof.

To process a natural language input, a system generally converts the natural language input to a computer or machine language that is able to be processed by the system. The conversion of the natural language input to a machine language is performed by processing the natural language input using a natural language interpreter. This interpreter attempts to determine what the user is attempting to provide as an input. In other words, the interpreter attempts to determine the intent of the user so that the system can provide an accurate and complete response to the user. The interpreter generally accesses domain ontologies and/or knowledge graphs to assist in interpreting the natural language input. For example, the system may parse the natural language input and identify an ontology that may be associated with the input. Using the ontology, the system can then interpret the remaining portion of the input to identify the intent or request of the user. Similarly, the system may access a knowledge graph. The knowledge graph may include a plurality of nodes each comprising a concept or entity and a plurality of edges that connect pairs of the nodes, the edges representing relationships between the concepts or entities represented by the connected nodes.

When the system attempts to interpret the natural language input, for example, a natural language query, the system may identify one or more ambiguities included in the input. While the user may not have intended any ambiguities, the system may identify one or more interpretations of the received input. Based upon these different interpretations the response provided by the system may be different. In other words, if the system interprets the input based upon one interpretation, the response may be one type of response. On the other hand, if the system interprets the input based upon a different interpretation, the response may be a different type of response. Thus, the user may receive a response that is not actually accurate or complete with respect to the actual intent of the user.

Such an inaccurate or incomplete response may frustrate and/or confuse the user. However, a larger problem occurs when the user does not realize or know that the provided response is not accurate or complete. For example, when a user provides a query to a system, the user does not typically know the answer. However, if the user has no idea regarding the type of answer that should be provided, the user may think that the provided answer is correct, which may cause additional frustrations or problems to the user. In other words, if the user does not know enough about the answer to know whether it is even related or close to an expected answer, the user cannot be sure that the query was interpreted correctly.

Alternatively, the user providing the query may be a user who requires an application program interface (API) to answer questions of a given template. The user may know the answer template. Therefore, when the system provides a response the user may know whether the response is correct or incorrect. However, the user may not know if the system accurately interpreted the query provided by the user. For example, multiple interpretations of one query may result in the same answer. Thus, the user does not know which interpretation was used to provide the response. Accordingly, the user is unsure of whether the API is the one that the user actually desires.

Some existing systems try to solve this problem by providing information related to the question/answer system internals to the user. For example, the system may provide the machine language query that was actually used by the system to generate a response to the user. As another example, the system may provide the ontology semantics that were used to interpret the provided input. However, the user may not know enough about machine language syntax or internal semantic data to be able to determine whether that provided information indicates that the system understood the user intent. Additionally, some systems may be unable to reveal internal system computations due to built-in restrictions, for example, confidentiality restrictions, privacy restrictions, or the like. Additionally, even if the system provides a natural language representation of the semantics or internal computations, which most systems do not, the provided representation may not be enough for the user to determine whether the desired intent was accurately captured by the system.

Some systems attempt to disambiguate the ambiguity by asking follow-up or clarification questions of the user. One problem with this method is that the system query answering then becomes user dependent. Thus, the system cannot learn from each query provided by a user because each user may have a different intent. Additionally, such a system becomes frustrating and time-consuming to a user because the user has to provide additional input other than just the initial query. If a user does not have the time to answer the additional questions, the user may give up and just not receive a response to the initial question. Additionally, some clarification questions may be confusing to some users which may result in answers that do not correlate to the user's original intent. Thus, the user may receive a response that is still inaccurate or incomplete.

Accordingly, the techniques and systems as described herein provide a system and technique for identifying ambiguities in received input that result in multiple possible interpretations and generating assisting question/answer pairs for each of the interpretations. The generated assisting question/answer pairs are provided to the user so that the user can determine which interpretation comports with the original intent and, therefore, determine which response is the response that the user actually desired. The system receives a natural language query that may include an ambiguity. As the system attempts to interpret the query so that it can be converted to machine language, the system identifies a plurality of interpretations due to the included ambiguity.

For each of the interpretations, the system generates a plurality of example queries. The generated example queries include queries that allow a user to distinguish the interpretations and identify which interpretation is the correct or intended interpretation. In other words, the system generates a plurality of example queries for each interpretation. When the plurality of example queries are analyzed by the user across the plurality of interpretations, the user should be provided with an understanding of each interpretation and which interpretation is the correct interpretation. The system then generates answers for not only each of the example queries, but also for each interpretation of the query. The system then provides the answers corresponding to each interpretation and also provides assisting question/answer pairs for each interpretation. The question/answer pairs or sets include the generated example queries and the answers corresponding to each of the example queries.

Such a system provides a technical improvement over current systems for natural language processing. When the system identifies an ambiguity in the query that results in different possible interpretations, the system generates assisting question/answer pairs for each of the interpretations. The system provides these assisting question/answer pairs to the user so that the user can understand the possible interpretations and then use the assisting question/answer pairs to determine which interpretation is the correct interpretation and, therefore, determine which response is the response that fulfills the user's original intent. Thus, rather than traditional systems which may provide information relating to internal computations or clarifications questions, the described system and methods provide an easy way for the user to identify which interpretation and answer is the correct interpretation and answer. Additionally, the system does not have to compromise confidential information which may occur when providing information relating to internal computations. Additionally, the user does not have to provide additional input to receive the desired response as in systems that provide clarification questions. Accordingly, the systems and methods as described herein are more intuitive, more user-friendly, faster, and more accurate than traditional systems.

Figure 1:
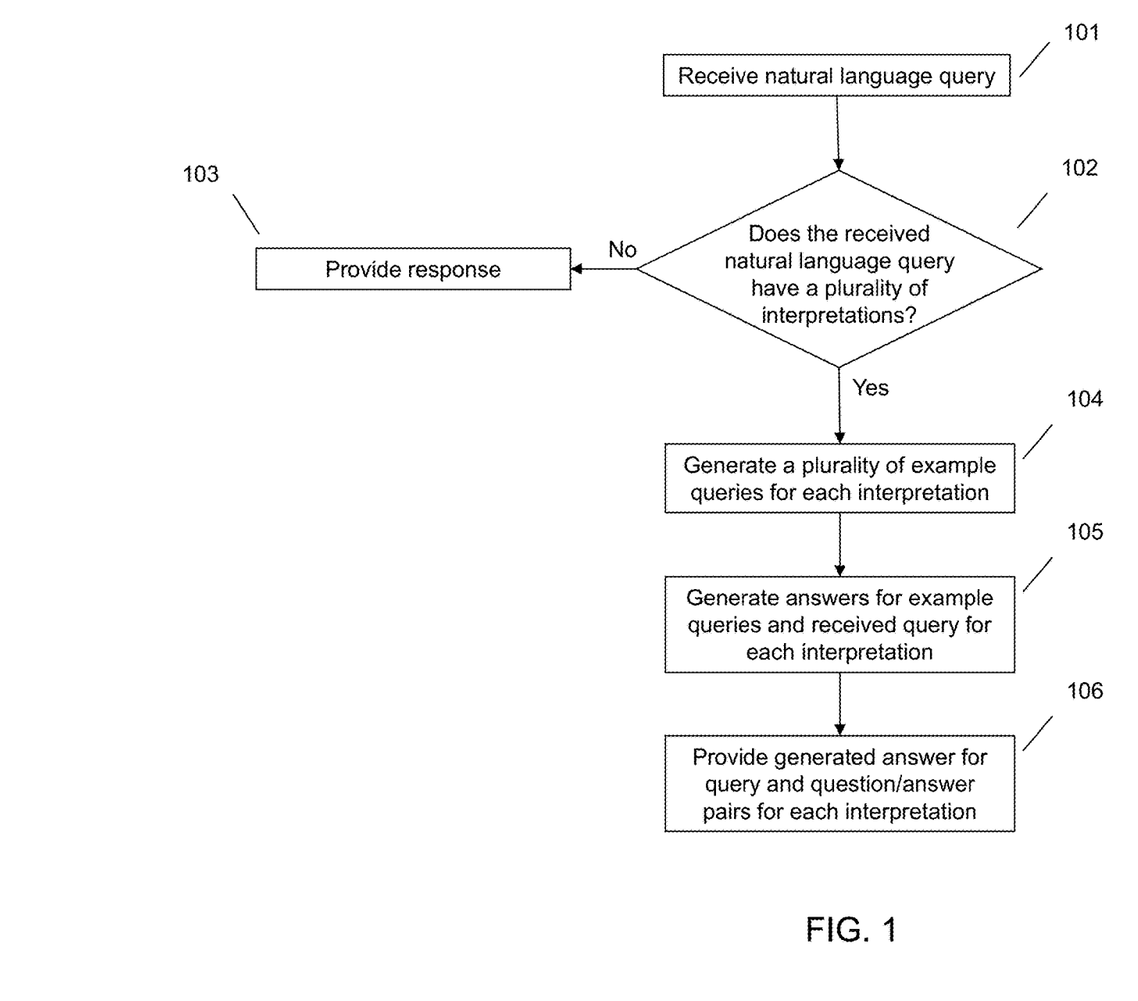
FIG. 1 illustrates a method of interpreting queries and providing example queries to distinguish the interpretations.

FIG. 1 illustrates a method for identifying ambiguities in received input that result in multiple possible interpretations and generating assisting question/answer pairs for each of the interpretations. At 101 the system receives a natural language query from a user. A natural language query includes a query that is provided in an ordinary human language, for example, as if the user were talking to another person. The term query will be used throughout. However, it should be understood that a query may include any type of input that requests a response from a system receiving the input. In other words, a query may include a request, demand, question, or other type of input that elicits a response from the receiving system. The natural language query may be provided in any form, for example, as audible input, text input, haptic input, gesture input, or the like.

Upon receipt of the query, the system may attempt to process the query to provide a response that is responsive to the input. To process the query the system may use a natural language interpreter. The natural language interpreter attempts to identify the intent of the user so that the query can be converted to machine or computer language. The natural language interpreter may access one or more sources in order to interpret the natural language query. For example, the natural language interpreter may access a domain ontology that is related to or corresponds to the topic or subject matter of the query. Using the domain ontology the natural language interpreter can then analyze the remaining portion of the query based upon terminology included in the ontology.

The natural language interpreter may also access a knowledge graph that may include an associated data store. The knowledge graph may include a plurality of nodes, where each node represents a topic or concept. The nodes may also represent sub-topics or sub-concepts. For example, the knowledge graph may include a plurality of graphs, where each graph represents a single topic. The nodes of this graph then represent sub-topics found within that topic. The nodes within the graph may be connected by edges that represent relationships between the nodes. For example, an edge may represent that one node belongs to another node. As another example, an edge may represent that one node is similar to another node. As a final example, an edge may represent a particular relationship that one node has with another node.

While attempting to process or interpret the query, the system may determine whether the received natural language query includes a plurality of interpretations at 102. The received query may result in a plurality of interpretations when an ambiguity occurs within the received input. An ambiguity may have been intended by the user, for example, the user may provide a vague query because the user is unsure of the exact query that will result in the desired response or the user may be unsure of the correct terminology that is required for an accurate response. Alternatively, the system may identify an ambiguity that was not intended by the user. For example, when processing the query the system may identify that a particular word may be interpreted in more than one way, thereby resulting in an ambiguity with respect to the user's intent. In other words, an ambiguity occurs when the exact intent of the user is unable to be discerned from the provided query. Thus, the ambiguity results in a query that can have multiple intents and, therefore, multiple interpretations.

If the received query does not have multiple interpretations at 102, the system may process the query using traditional techniques and provide a response at 103. If, however, the query does have multiple interpretations at 102, the system may generate a plurality of example queries for each of the plurality of interpretations. To generate the example queries the system may process each interpretation and generate the machine or computer language query that corresponds to each interpretation. The generation of this machine or computer language query can be performed using conventional machine language query generation techniques.

To determine what example queries to generate, the system may identify or classify the type of ambiguity that is present in the received query. This identification or classification may be based upon identifying or defining differences in the plurality of interpretations. The differences may be defined by identifying which difference level the difference occurs within. The difference levels may be selected from an interpretation tree difference level and an object query language difference level. As the system is attempting to interpret the natural language query, the system may use a plurality of interpretation techniques including interpretations trees and object query language annotations.

When using an interpretation tree, the system starts at a root node and then traverses the tree until it reaches a leaf node that corresponds to a particular response or interpretation. If, as the system is traversing the tree, the system determines that more than one branch could be accessed and still fulfill the query, the system determines that an ambiguity exists and, therefore, more than one interpretation is possible. A difference found in an interpretation tree indicates that an ambiguity existed in the original query and that the intent of the query is ambiguous. Different ambiguities that may be identified from the interpretation tree level include concept ambiguities (e.g., which level of abstraction of a concept is of interest), entity role ambiguities (e.g., which role of an entity was meant in the query), functional property ambiguities (e.g., what is the inherent relation that the user intended to query), data property ambiguities (e.g., which property of the concept is being queried), and the like.

When using object query language (OQL) annotations, the system accesses one or more databases or information sources using the machine language annotations of the objects within the query. The system can then find matches to the annotations to return a response to the query. If, when the system accesses the information sources, the system returns more than one result, the system determines that an ambiguity exists. A difference found at the object query language annotation level indicates that the query was understood unambiguously, but the exact computation resulted in different results. Different ambiguities that may be identified from the object query language annotations level may include annotation ambiguities (e.g., which of the implicit annotations are to be used in the correct interpretation), parameter ambiguities (e.g., what is the correct parameter), and the like.

Generation of the example queries is based upon the level at which the difference is identified because the different levels may have different examples that will be more useful in disambiguating the query. For example, one identified difference may have interpretations that are best disambiguated using the same set of example points across the plurality of interpretations, but that are diversified from the query within an interpretation. As another example, one identified difference may have interpretations that are best disambiguated using the same set of example points across the plurality of interpretations, but that are similar to the query within an interpretation. As a final example, one identified difference may have interpretations that are best disambiguated using different sets of example points across the plurality of interpretations where each set corresponds to the different concepts that are found for each interpretation. Thus, the generated example queries include queries for distinguishing the corresponding interpretation.

To select or generate the example queries, the system identifies an optimal set of example queries based upon the type of example points that are needed as identified from the identified difference. An optimal set of example queries will be diversified enough that the user can differentiate between the different interpretations. To choose the right set of ontology elements to differentiate, the system first identifies whether the difference is identified at the interpretation tree level or the OQL annotation level. If the difference is identified at the OQL annotation level, meaning the interpretation tree is the same for both interpretations, the system determines if the entity instances that are to be similar to the entity instance in the user query and/or if the entity instances are to be the same across interpretations. The system may determine that the entity instances are to be similar to the user query and the same across the plurality of interpretations, for example, in the case of an annotation ambiguity and in the case of a parameter ambiguity.

In the event that the difference is in the interpretation tree level, the system may determine if the entity instances are to differ across the interpretations and/or if the entity instances are to be diversified within an interpretation with respect to the user query. The system may determine that the set of concepts are to differ across the interpretations, for example, in the case of an entity role ambiguity. If this is the case, the chosen example instances exclusively belong to the concept of the interpretation. In other words, the instances that are chosen for each interpretation are those instances that only belong to that interpretation. The system may determine that the entity instances are to be diversified within interpretations with respect to the user query and the same across interpretations, for example, in the case of a concept ambiguity, a functional property ambiguity, or a data property ambiguity. Based upon the determination of whether the examples are to be diversified in an interpretation with respect to the user query and/or are to be the same across the plurality of interpretations, the system outputs properties that are in a threshold neighborhood of diversifying concepts.

Using the received set of properties the system, for each property, clusters the values of the properties across the complete data store. The property is then assigned a diversity score which identifies the inter-cluster distance among the clusters. The property is also assigned a differentiation score which identifies the maximum number of interpretations that produce distinct answers for a specific value of the property. The system then creates a two-dimensional search space by generating search space points based upon the diversity scores and differentiation scores of each property. Thus, skyline points are computed over the two-dimensional search space from the search space points. The system then generates a subset space for each possible value of a property in the skyline points by identifying the subset of interpretations that can be differentiated by setting the value of a property to a particular value. The system then computes a minimal set cover over the subset space that covers all possible relevant properties, where the minimal set cover are the most diversified and differentiating across the possible interpretations. The example queries are then chosen from the minimal set cover.

Once the system has selected and generated the example queries, the system generates answers or responses for the example queries and for the received query corresponding to each interpretation at 105. In other words, not only does the system generate answers for the example queries, but the system also generates an answer for the received query for each possible interpretation. The system generates these answers using conventional answer generation techniques, for example, by accessing and searching data sources for the answer. The system then, at 106, provides the generated answer for the query and a plurality of question/answer pairs, also referred to as assisting question/answer sets, for each interpretation to the user, for example, by displaying the answers, audibly providing the answer and question/answer pairs, or otherwise outputting the answer and question/answer pairs. The user can then use the question/answer pairs to assist in distinguishing which interpretation corresponds to the user's original intent in the provide query. The provided answers and question/answer pairs may be provided as a natural language response.

Figure 2:
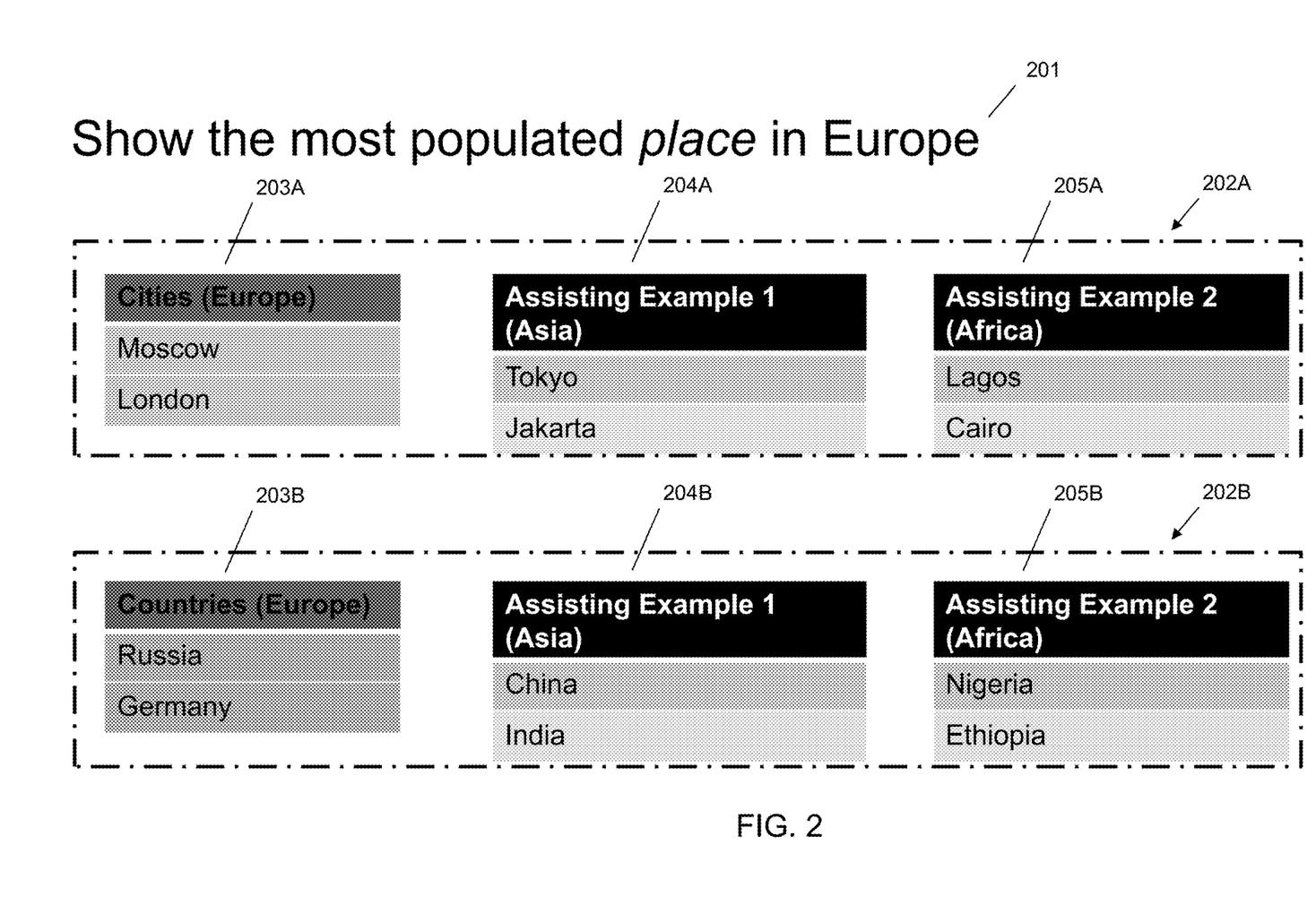
FIG. 2 illustrates an example output of interpretations having a concept ambiguity.

An overall example of a concept ambiguity identified at the interpretation tree level is illustrated in FIG. 2. The query 201 requests the most populated place in Europe. When processing the query, the system identifies that "place" is ambiguous and corresponds to the concept within the query. Thus, the system identifies that one interpretation of "place" may be cities 202A and another interpretation of "place" may be countries 202B. The generated answers for the query 201 corresponding to the city interpretation 202A are shown at 203A. The system also provides assisting examples 204A and 205A that include a query as if the query included Asia instead of Europe 204A and a query as if the query included Africa instead of Europe 205A. The system also provides the answers to these queries in the assisting examples 204A and 205A. The system completes a similar process for the second interpretation 203B. As can be seen, the assisting examples for each interpretation are diversified from the user query. In other words, the assisting examples use Asia and Africa which are both continents, as with the user query, but are different countries from the query. Additionally, the assisting examples are the same across the plurality of interpretations. In other words, the assisting example Asia is used in the first interpretation 204A and is also used in the second interpretation 204B.

Figure 3:
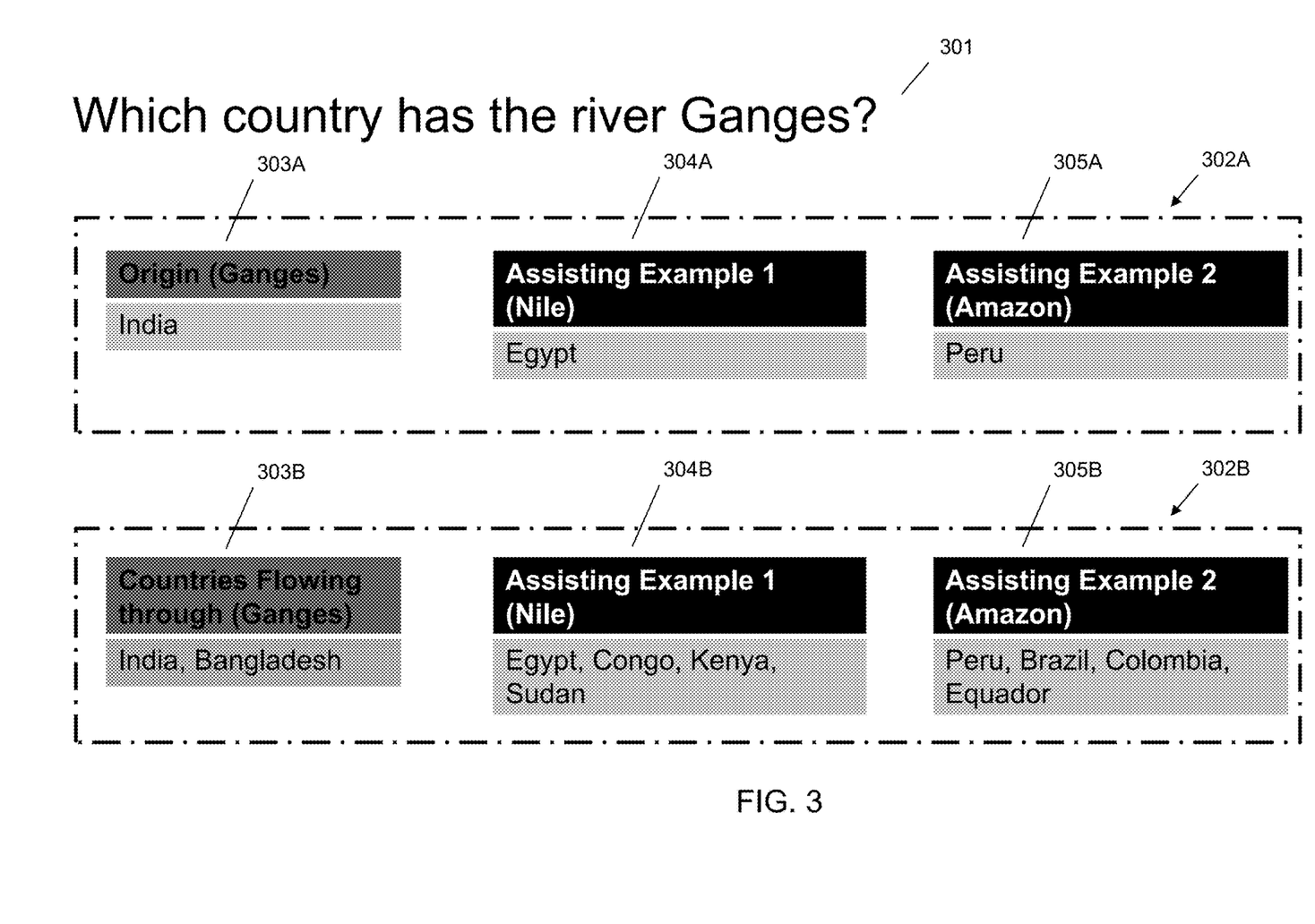
FIG. 3 illustrates an example output of interpretations having a functional ambiguity.

An overall example of a functional ambiguity identified at the interpretation tree level is shown in FIG. 3. In this example, the ambiguity in the query 301 is the function of "country". In other words, by "country" does the user mean the country of origin, the interpretation illustrated at 302A, or the countries that the river flows through, the interpretation illustrated at 302B? As with FIG. 2, the answer to the query based upon each interpretation is illustrated at 303A and 303B. Additionally, similar to FIG. 2, the assisting examples 304A, 305A, 304B, and 305B are diversified within the interpretation with respect to the user query (304A and 305A are different entity instances from the query 301) and the same across the plurality of interpretations (304A and 304B are the same entity instances and 305A and 305B are the same entity instances).

Figure 4:
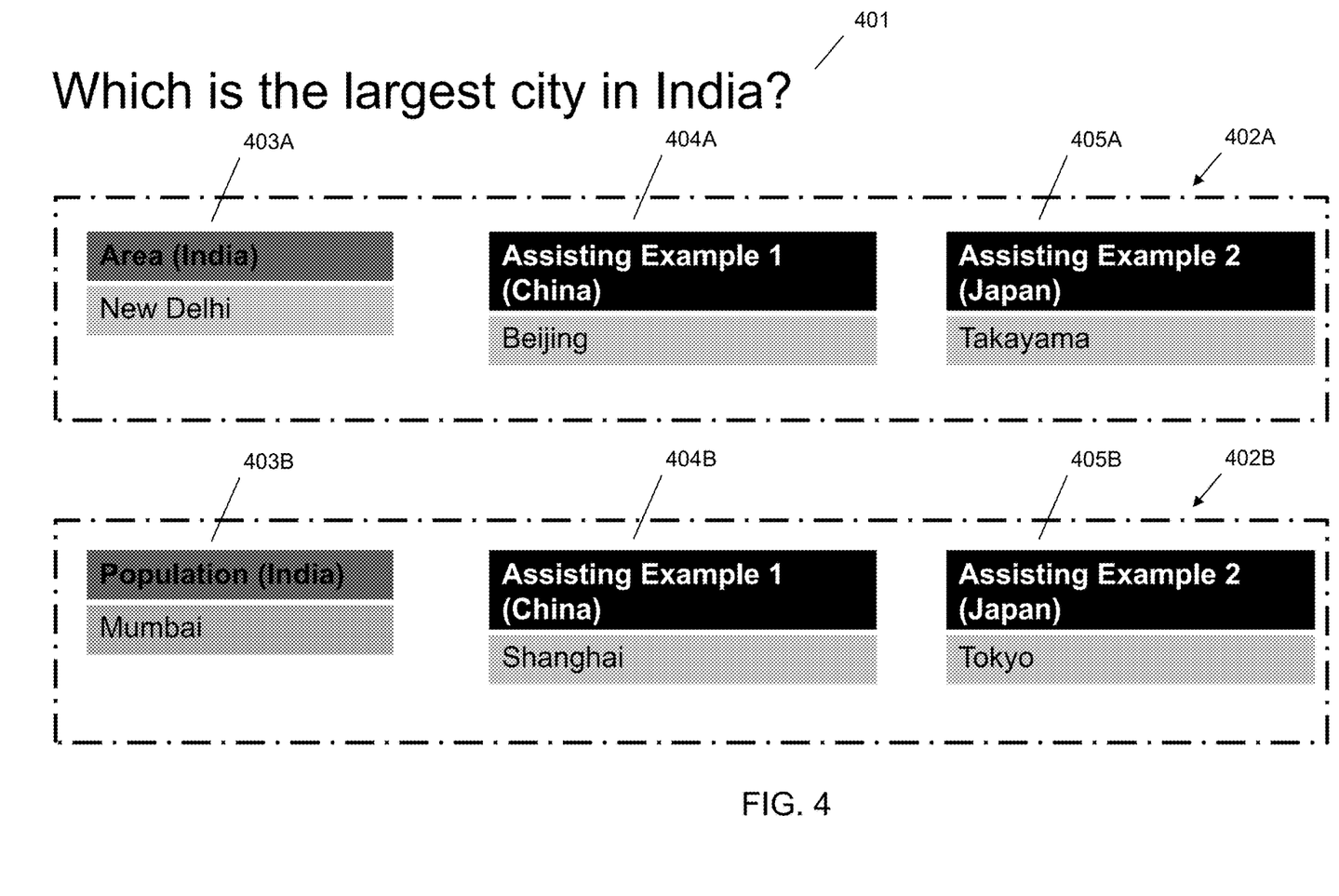
FIG. 4 illustrates an example output of interpretations having a data property ambiguity.

An overall example of a data property ambiguity identified at the interpretation tree level is shown in FIG. 4. In this example, the ambiguity in the query 401 is what is meant by "largest". In other words, by "largest" does the user mean largest by area, the interpretation illustrated at 402A, or largest by population, the interpretation illustrated at 402B? As with the FIG. 2 and FIG. 3, the answer to the query based upon each interpretation is illustrated at 403A and 403B. Additionally, similar to FIG. 2 and FIG. 3, the assisting examples 404A, 405A, 404B, and 405B are diversified within the interpretation with respect to the user query (404A and 405A are different entity instances from the query 401) and the same across the plurality of interpretations (404A and 404B are the same entity instances and 405A and 405B are the same entity instances).

Figure 5:
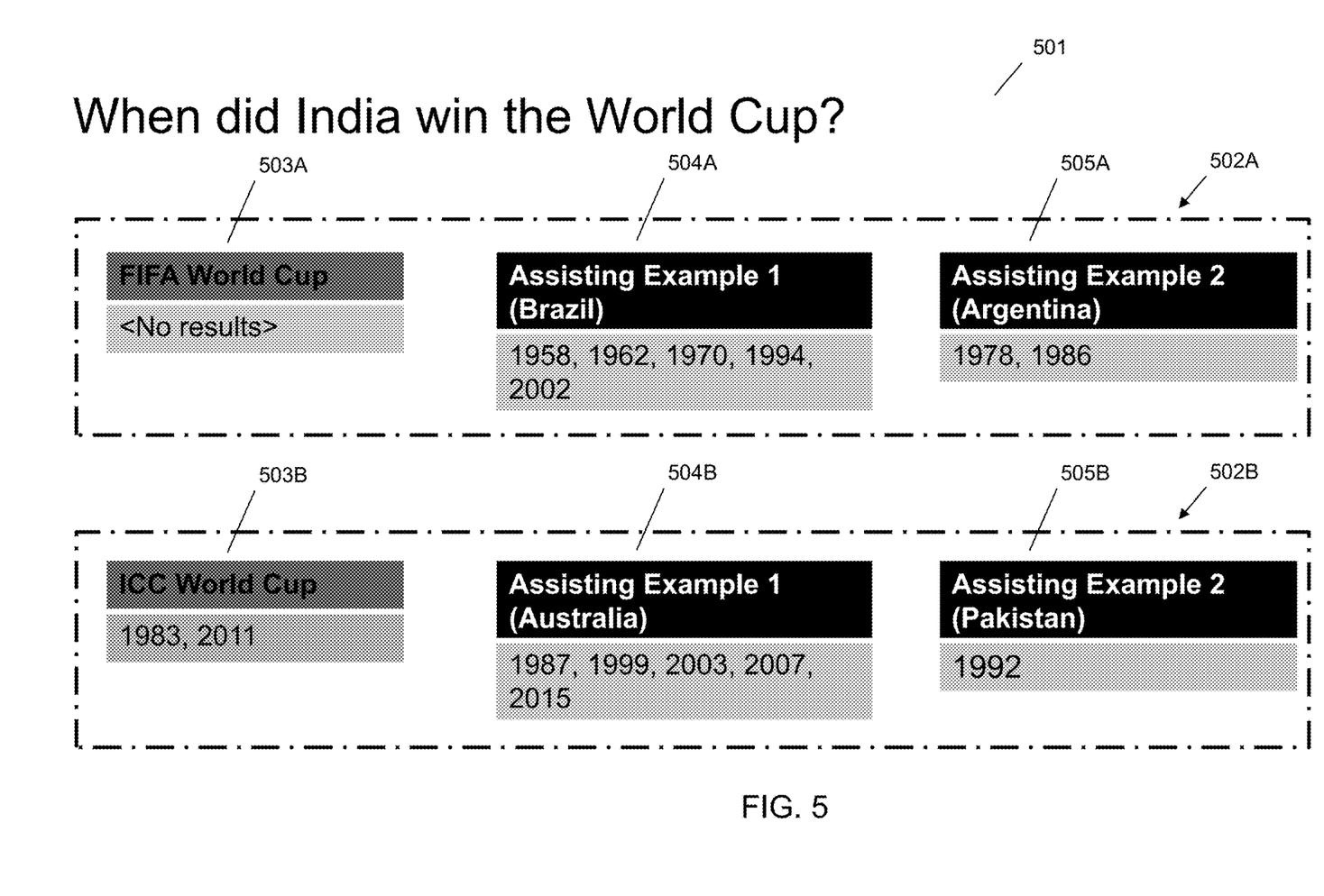
FIG. 5 illustrates an example output of interpretations having an entity role ambiguity.

An overall example of an entity role ambiguity identified at the interpretation tree level is shown in FIG. 5. In this example, the ambiguity in the query 501 is what role the entity "World Cup" has within the query 501. In other words, by "World Cup" does the user mean the FIFA World Cup, the interpretation illustrated at 502A, or the ICC World Cup, the interpretation illustrated at 502B? As with the previous figures, the answer to the query based upon each interpretation is illustrated at 503A and 503B. However, unlike the previous examples the assisting examples 504A, 505A, 504B, and 505B use example points that belong to the input entity concept. In other words, as opposed to being diversified with respect to the entity of the interpretation, the assisting examples belong to the same input entity concept as the input entity concept of the user query. Additionally, also in contrast to the previous examples, the assisting examples differ across the interpretations (504A and 505A have different entity instances than 504B and 505B).

Figure 6:
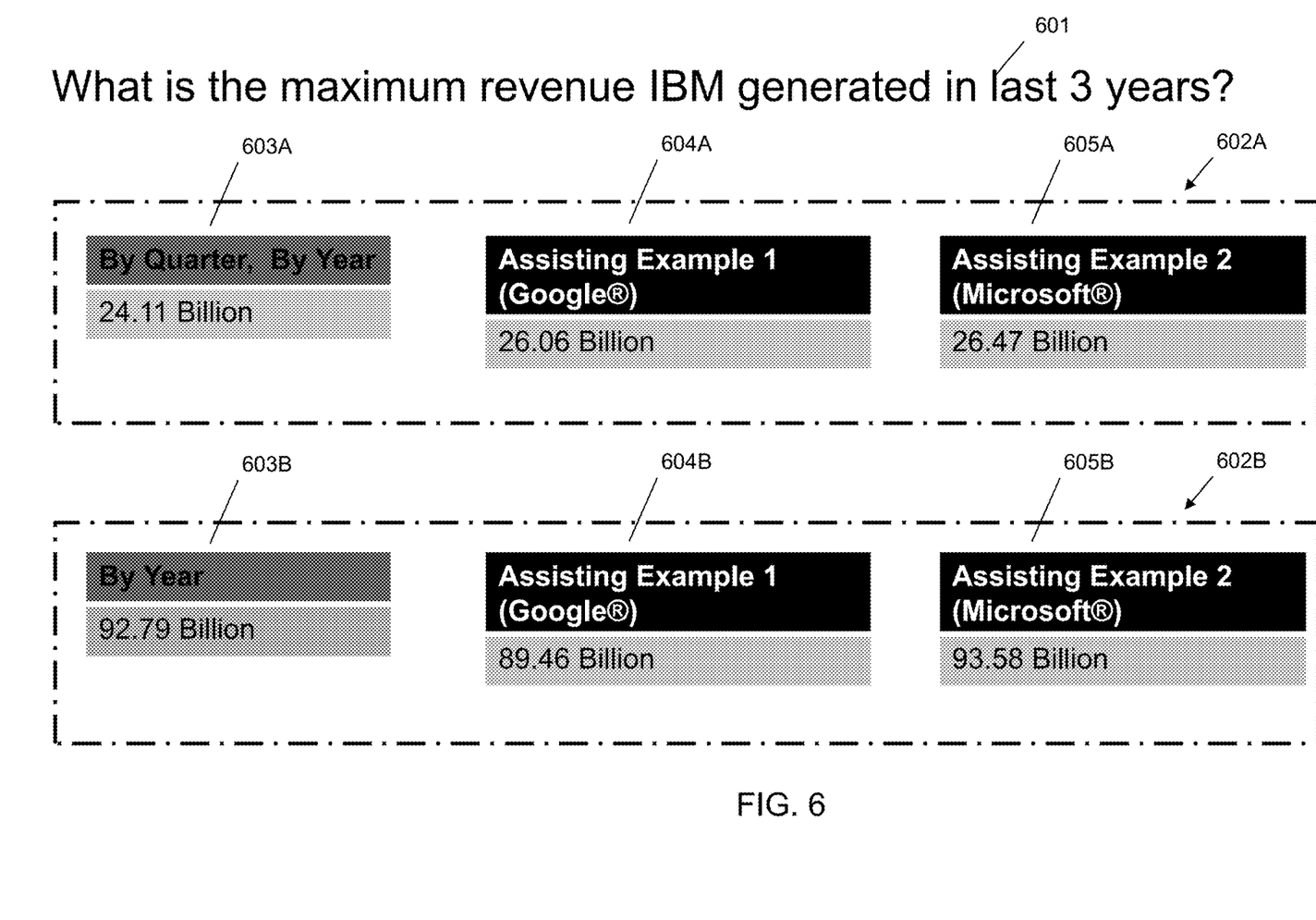
FIG. 6 illustrates an example output of interpretations having an annotation ambiguity.

An overall example of an annotation ambiguity identified at the OQL annotation level is shown in FIG. 6. In this example, the ambiguity is not found in the user query 601. Rather, the ambiguity occurs when the system attempts to return results and finds that different annotations result in different responses. In other words, the system identifies that a "by quarter, by year" annotation, the interpretation illustrated at 602A, returns different results than a "by year" annotation, the interpretation illustrated at 602B. As with the previous examples of the answer to the query based upon each interpretation is illustrated at 603A and 603B. However, in this example, the assisting examples 604A, 605A, 604B, and 605B that are chosen are similar to the input entity, as opposed to diversified as in the examples of FIG. 2, FIG. 3, and FIG. 4. In other words, GOOGLE and MICROSOFT are entities that are similar to IBM. However, like the examples of FIG. 2, FIG. 3, and FIG. 4, the assisting examples are the same across the plurality of interpretations (604A and 604B are the same entity instances and 605A and 605B are the same entity instances). GOOGLE is a registered trademark of Google, Inc., in the United States and other countries. MICROSOFT is a registered trademark of Microsoft Corporation in the United States and other countries. IBM is a registered trademark of International Business Machines Corporation in the United States and other countries.

Figure 7:
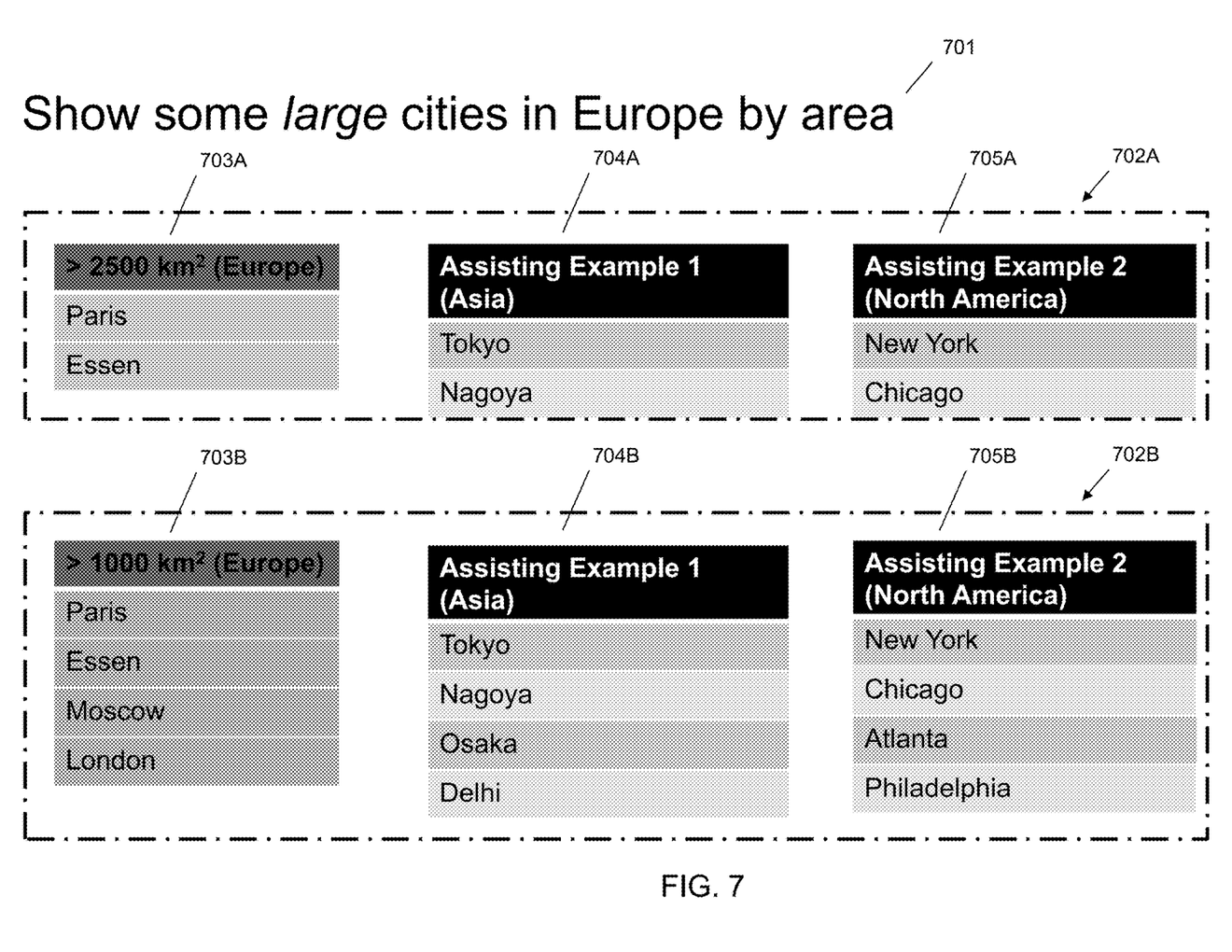
FIG. 7 illustrates an example output of interpretations having a parameter ambiguity.

An overall example of a parameter ambiguity identified at the OQL annotation level is shown in FIG. 7. In this example, like in the example of FIG. 6, the ambiguity is not found in the user query 701. Rather, the ambiguity occurs when the system attempts to return results and finds that different parameters result in different responses. In other words, the system identifies that using the parameter ">2500 $km^2$" for "large", the interpretation illustrated at 702A, returns different results or responses than using the parameter ">1000 $km^2$" for "large", the interpretation illustrated at 702B. As with the previous examples of the answer to the query based upon each interpretation is illustrated at 703A and 703B. This example is similar to the example illustrated in FIG. 6, where the assisting examples 704A, 705A, 704B, and 705B that are chosen are similar to the input entity, as opposed to diversified as in the examples of FIG. 2, FIG. 3, and FIG. 4. In other words, Asia and North America are entities that are similar to Europe of the user query. Additionally, like the examples of FIG. 2, FIG. 3, FIG. 4, and FIG. 6, the assisting examples are the same across the plurality of interpretations. (704A and 704B are the same entity instances, and 705A and 705B are the same entity instances.)

Thus, the system provides a technique that provides assisting examples that allow the user to distinguish between the different interpretations which may correspond to different user intents. Accordingly, the systems and methods as described herein allow the user to choose the answer to the query the matches the user's original intent without requiring additional input or by providing additional information that may not be useful to the user in making a determination regarding the correct interpretation, as with conventional techniques.

Figure 8:
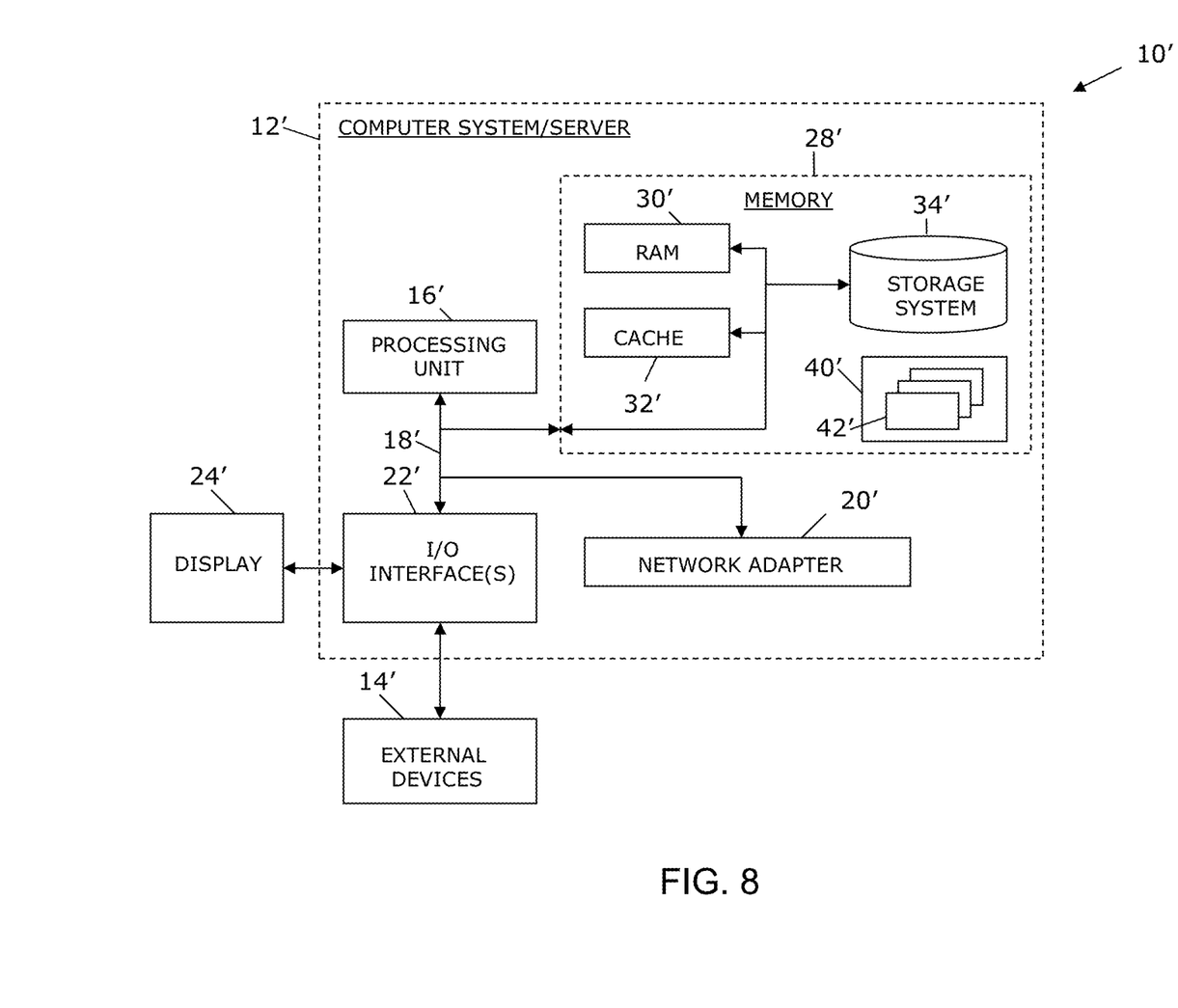
FIG. 8 illustrates a computer system.

As shown in FIG. 8, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   utilizing at least one processor to execute computer code configured to perform the steps of:
   receiving a natural language query from a user;
   identifying a plurality of interpretations for interpreting the natural language query, wherein the plurality of interpretations are based upon at least one ambiguity in the received natural language query;

generating, for each of the plurality of interpretations, a plurality of example queries, wherein the generated plurality of example queries for the plurality of interpretations comprises queries for distinguishing a corresponding interpretation, wherein the generating comprises classifying a type of the at least one ambiguity by identifying a difference level within an interpretation tree that the at least one ambiguity occurs within, wherein the identifying a difference level comprises accessing a root node of the interpretation tree, traversing the interpretation tree to reach at least one leaf node corresponding to a response to the received natural language query, and identifying more than one leaf node that results in a response to the received natural language query;

generating, for each interpretation of the plurality of interpretations, both (i) an answer to the received natural language query and (ii) an answer to each of the generated plurality of example queries; and providing, to the user, (i) the answer generated for the received natural language query and (ii) a plurality of question/answer pairs for each of the identified plurality of interpretations that assists in disambiguating the at least one ambiguity, wherein each question/answer pair comprises one of the generated plurality of example queries and the answer generated for the one of the generated plurality of example queries.

2. The method of claim 1, wherein the generating a plurality of example queries comprises defining differences, based upon the at least one ambiguity, between the plurality of interpretations.

3. The method of claim 2, wherein the defining differences comprises identifying a difference level selected from a group consisting of an interpretation tree level and an object query language annotation level in which a difference occurs.

4. The method of claim 3, wherein the identified difference level comprises the interpretation tee level and wherein the generated plurality of example queries, for each of the plurality of interpretations, are diversified across a knowledge set as compared to the received natural language query.

5. The method of claim 4, wherein the at least one ambiguity is selected from a group consisting of a concept ambiguity, a functional property ambiguity, and a data property ambiguity within the interpretation tee level.

6. The method of claim 5, wherein the generated plurality of example queries are the same across the plurality of interpretations and result in different answers for each of the plurality of interpretations.

7. The method of claim 4, wherein the at least one ambiguity comprises an entity role ambiguity and wherein the generated plurality of example queries are different for each of the plurality of interpretations and result in different answers for each of the plurality of interpretations.

8. The method of claim 3, wherein the identified difference level comprises the object query language annotation level;

wherein the ambiguity comprises an annotation ambiguity;

wherein the generated plurality of example queries, for each of the plurality of interpretations, are similar to the received natural language query; and wherein the generated plurality of example queries are the same across the plurality of interpretations and result in different answers across the plurality of interpretations.

9. The method of claim 3, wherein the identified difference level comprises the object query language annotation level;

wherein the at least one ambiguity comprises a parameter ambiguity;

wherein the generated plurality of example queries, for each of the plurality of interpretations, are diversified across a knowledge set as compared to the received natural language query; and wherein the generated plurality of example queries are the same across the plurality of interpretations and result in different answers across the plurality of interpretations.

10. The method of claim 1, wherein the providing comprises providing (i) the generated answer and (ii) the plurality of question/answer pairs as natural language responses.

11. An apparatus, comprising:

at least one processor; and a computer readable storage medium having computer readable program code embodied herewith and executable by the at least one processor, the computer readable program code comprising:

computer readable program code configured to receive a natural language query from a user;

computer readable program code configured to identify a plurality of interpretations for interpreting the natural language query, wherein the plurality of interpretations are based upon at least one ambiguity in the received natural language query;

computer readable program code configured to generate, for each of the plurality of interpretations, a plurality of example queries, wherein the generated plurality of example queries for the plurality of interpretations comprises queries br distinguishing a corresponding interpretation, wherein the generating comprises classifying a type of the at least one ambiguity by identifying a difference level within an interpretation tee that the at least one ambiguity occurs within, wherein the identifying a difference level comprises accessing a root node of the interpretation tee, traversing the interpretation tree to reach at least one leaf node corresponding to a response to the received natural language query, and identifying more than one leaf node that results in a response to the received natural language query;

computer readable program code configured to generate, for interpretation of the plurality of interpretations, both (i) an answer to the received natural language query and (ii) an answer to each of the generated plurality of example queries; and computer readable program code configured to provide, to the user, (i) the answer generated br the received natural language query and (ii) a plurality of question/answer pairs for each of the identified plurality of interpretations that assists in disambiguating the at least one ambiguity, wherein each question/answer pair comprises one of the generated plurality of example queries and the answer generated for the one of the generated plurality of example queries.

12. A computer program product, comprising:

a computer readable storage medium having computer readable program code embodied herewith, the computer readable program code executable by a processor and comprising:

computer readable program code configured to receive a natural language query from a user;

computer readable program code configured to identify a plurality of interpretations for interpreting the natural language query, wherein the plurality of interpretations are based upon at least one ambiguity in the received natural language query;

computer readable program code configured to generate, for each of the plurality of interpretations, a plurality of example queries, wherein the generated plurality of example queries for the plurality of interpretations comprises queries br distinguishing a corresponding interpretation, wherein the generating comprises classifying a type of the at least one ambiguity by identifying a difference level within an interpretation tee that the at least one ambiguity occurs within, wherein the identifying a difference level comprises accessing a root node of the interpretation tee, traversing the interpretation tree to reach at least one leaf node corresponding to a response to the received natural language query, and identifying more than one leaf node that results in a response to the received natural language query;

computer readable program code configured to generate, for interpretation of the plurality of interpretations, both (i) an answer to the received natural language query and (ii) an answer to each of the generated plurality of example queries; and computer readable program code configured to provide, to the user, (i) the answer generated for the received natural language query and (ii) a plurality of question/answer pairs for each of the identified plurality of interpretations that assists in disambiguating the at least one ambiguity, wherein each question/answer pair comprises one of the generated plurality of example queries and the answer generated for the one of the generated plurality of example queries.

13. The computer program product of claim 12, wherein the generating a plurality of example queries comprises defining differences, based upon the at least one ambiguity, between the plurality of interpretations.

14. The computer program product of claim 13, wherein the defining differences comprises identifying a difference level selected from a group consisting of an interpretation tee level and an object query language annotation level in which a difference occurs.

15. The computer program product of claim 14, wherein the identified difference level comprises the interpretation tree level and wherein the generated plurality of example queries, for each of the plurality of interpretations, are diversified across a knowledge set as compared to the received natural language query.

16. The computer program product of claim 15, wherein the at least one ambiguity is selected from a group consisting of a concept ambiguity, a functional property ambiguity, and a data property ambiguity within the interpretation tee level and wherein the generated plurality of example queries are the same across the plurality of interpretations and result in different answers for each of the plurality of interpretations.

17. The computer program product of claim 15, wherein the at least one ambiguity comprises an entity role ambiguity and wherein the generated plurality of example queries are different for each of the plurality of interpretations and result in different answers for each of the plurality of interpretations.

18. The computer program product of claim 14, wherein the identified difference level comprises the object query language annotation level;
wherein the at least one ambiguity comprises an annotation ambiguity;
wherein the generated plurality of example queries, for each of the plurality of interpretations, are similar to the received natural language query; and
wherein the generated plurality of example queries are the same across the plurality of interpretations and result in different answers across the plurality of interpretations.

19. The computer program product of claim 14, wherein the identified difference level comprises the object query language annotation level;
wherein the at least one ambiguity comprises a parameter ambiguity;
wherein the generated plurality of example queries, for each of the plurality of interpretations, are diversified across a knowledge set as compared to the received natural language query; and
wherein the generated plurality of example queries are the same across the plurality of interpretations and result in different answers across the plurality of interpretations.

20. A method, comprising:
utilizing at least one processor to execute computer code configured to perform the steps of receiving a query;
identifying at least one ambiguity in the received query resulting in a plurality of possible interpretations for the received query, wherein the identifying at least one ambiguity comprises classifying a type of the at least one ambiguity by identifying a difference level within an interpretation tee that the at least one ambiguity occurs within, wherein the identifying a difference level comprises accessing a root node of the interpretation tee, traversing the interpretation tree b reach at least one leaf node corresponding b a response to the received query, and identifying more than one leaf node that results in a response to the received query;
producing a plurality of assisting queries for each of the plurality of possible interpretations, wherein the plurality of assisting queries assist in disambiguating the identified at least one ambiguity in the received query across the plurality of possible interpretations;
generating (i) a plurality of answers for the received query, each answer of the plurality of answers corresponding b one of the plurality of possible interpretations and (ii) an answer for each query of the plurality of assisting queries; and
displaying, for each interpretation of the plurality of possible interpretations, (i) the generated plurality of answers and (ii) a plurality of assisting question/answer sets, wherein each assisting question/answer set comprises one of the produced plurality of assisting queries and the answer corresponding to the one of the produced plurality of assisting queries.

* * * * *